United States Patent
Wang (10) Patent No.: US 10,147,562 B2
(45) Date of Patent: Dec. 4, 2018

(54) ON-LOAD VOLTAGE REGULATION TAP SWITCH FOR TRANSFORMER AND SWITCH CONTROL METHOD

(71) Applicant: Hai Wang, Beijing (CN)

(72) Inventor: Hai Wang, Beijing (CN)

( * ) Notice: Subject to any disclaimer, the term of this patent is extended or adjusted under 35 U.S.C. 154(b) by 15 days.

(21) Appl. No.: 15/528,968

(22) PCT Filed: Nov. 18, 2015

(86) PCT No.: PCT/CN2015/094882
§ 371 (c)(1),
(2) Date: May 23, 2017

(87) PCT Pub. No.: WO2016/082704
PCT Pub. Date: Jun. 2, 2016

(65) Prior Publication Data
US 2017/0271096 A1   Sep. 21, 2017

(30) Foreign Application Priority Data

Nov. 25, 2014 (CN) .......................... 2014 1 0680074

(51) Int. Cl.
*H01F 29/02* (2006.01)
*H01F 29/04* (2006.01)
(Continued)

(52) U.S. Cl.
CPC ........... *H01H 9/0027* (2013.01); *H01F 29/02* (2013.01); *H01F 29/04* (2013.01); *H01H 9/0038* (2013.01);
(Continued)

(58) Field of Classification Search
CPC ....... H01F 29/02; H01F 29/04; H01H 9/0005; H01H 9/0027; H01H 9/0038;
(Continued)

(56) References Cited

U.S. PATENT DOCUMENTS 3,662,253 A * 5/1972 Yamamoto .............. H01F 29/04
                                                              323/343
3,739,256 A * 6/1973 Matzl ...................... H01F 29/04
                                                              323/343
(Continued)

FOREIGN PATENT DOCUMENTS

CN    101039091    9/2007
CN    203734580    7/2014

*Primary Examiner* — Timothy J Dole
*Assistant Examiner* — Ivan Laboy Andino
(74) *Attorney, Agent, or Firm* — Barnes & Thornburg LLP; Jeffrey R. Stone (57) ABSTRACT

Disclosed is an on-load voltage regulation tap switch for a transformer, comprising a main switch group, a switch contact protection branch and a switch control circuit, wherein the main switch group comprises a plurality of switch contacts, one end of the switch group is connected to a corresponding transformer winding tap, and the other end of the switch group is connected in parallel and is then connected to a power source; the switch contact protection branch is a series circuit formed by a plurality of groups of diodes and auxiliary switch contacts, and is respectively connected to both ends of a corresponding main switch in parallel; and the switch control circuit is composed of a power source, a single chip microcomputer and a peripheral circuit, and controls all of the main switches and auxiliary switches to act in a certain time sequence to complete the switching of the transformer windings.

8 Claims, 7 Drawing Sheets

(51) Int. Cl.
*H02P 13/06* (2006.01)
*H01H 9/00* (2006.01)
*H02M 5/10* (2006.01)

(52) U.S. Cl.
CPC .............. *H02M 5/10* (2013.01); *H02P 13/06* (2013.01); *H01H 2009/0061* (2013.01)

(58) Field of Classification Search
CPC ......... H01H 2009/0061; H01H 9/0011; H01H 9/0016; H01H 9/0033; H01H 9/40; H01H 9/541; H01H 9/542; H01H 9/547; H01H 9/548; H01H 2009/546; H02P 13/06; H02P 13/00; H02M 5/10; G05F 1/14; G05F 1/147; G05F 1/153; G05F 1/16; G05F 1/20; G05F 1/22
USPC .......... 323/255–258, 340–343; 336/137–150
See application file for complete search history.

(56) References Cited

U.S. PATENT DOCUMENTS

| | | | | |
|---|---|---|---|---|
| 4,608,627 A * | 8/1986 | Holt | ........................ | H02P 13/06 310/11 |
| 5,006,784 A * | 4/1991 | Sonntagbauer | ......... | H01F 29/04 323/343 |
| 6,108,226 A * | 8/2000 | Ghosh | ..................... | H02M 1/10 323/255 |
| 2008/0074073 A1* | 3/2008 | Genkawa | ................ | H02P 13/06 318/779 |
| 2012/0313594 A1* | 12/2012 | Brueckl | .............. | H01H 9/0027 323/258 |

* cited by examiner

ON-LOAD VOLTAGE REGULATION TAP SWITCH FOR TRANSFORMER AND SWITCH CONTROL METHOD

TECHNICAL FIELD

The present invention relates to an alternating-current voltage regulation device, and in particular relates to a changeover switch for changing a secondary output voltage of a transformer through a primary tap of the transformer.

BACKGROUND

When a power transformer is operated, since the change of an incoming voltage or the change of a load will cause the change of an output voltage, the secondary output voltage can be changed by changing the number of turns of primary windings of the power transformer, thereby achieving a purpose of regulating or stabilizing the voltage. A purpose of changing the output voltage can be achieved by using a tap switch to change the number of turns of coils. On-load voltage regulation of the transformer is to change the number of turns of the primary windings of the transformer through an on-load regulation tap switch when the transformer is not powered off and is under a normal working condition, and this is a task to be completed by the on-load voltage regulation (tapping) switch. The on-load tap switch mainly consists of a selection switch, a changeover switch and a rotating mechanism; and in the nearly 100 years of development history of the on-load tap switch, the electrical and mechanical properties of the on-load tap switch are greatly improved, but the basic principle and structure are essentially not changed. Failure of the on-load tap switch mainly includes two aspects, i.e. the electrical property and the mechanical property: the electrical property mainly refers to a contact resistance of a contact, and when the contact resistance of the contact is increased, the contact may be over-heated and even burnt down. The mechanical property refers to a coordination between an action sequence and time for the selection switch, the changeover switch and other components in the operation process of the on-load tap switch (OLTC), as well as clamping, insufficient contact changeover and the like in the switching process.

When the tap switch acts, the sudden change of a current in a primary coil of the transformer may be caused, which may generate a high counter self-induction electromotive force to generate an electric arc at the contact, resulting in the burning of the contact; a vacuum-type switch is used to substitute an oil-immersion switch, so that the reliability of the contact can be improved, but the cost is greatly increased; and on the other hand, the vacuum-type switch cannot solve the problem of the sudden change of the current in the primary coil, and the suddenly-changed current may generate residual flux which is easy to cause the overload and burning of the transformer when the transformer is fully-loaded.

SUMMARY

An objective of the present invention is to provide an on-load voltage regulation tap switch for transformer, which has no mechanical rotating mechanism, would not generate current surge when the tap switch switches coils, may prevent sparking or arcing at a switch contact and is an ideal on-load voltage regulation tap switch for transformer, so as to overcome the above deficiencies in an existing art.

The objective of the present invention is realized through following technical solutions.

An on-load voltage regulation tap switch for transformer includes a main switch group, switch contact protection branch circuits and a switch control circuit; where the main switch group includes a plurality of relay switch contacts; one end of the switch group is connected with a corresponding transformer winding tap, and the other end of the switch group is connected with a power supply after being connected in parallel; each switch contact protection branch circuit of the switch group is a series circuit of a diode and an auxiliary relay contact and is respectively connected with two ends of a corresponding switch contact in parallel; the switch control circuit is composed of a power supply, a single chip microprocessor, a current transformer, a control signal receiving module and other circuits; and all main switches and auxiliary switches are controlled by the switch control circuit to act according to a certain time sequence so as to complete switching of the transformer windings and ensure that there is always one switch contact in a closed state.

Further, the power supply of the switch control circuit may be provided by the current transformer.

Further, the main switches and the auxiliary switches may be magnetic latching relays.

Further, a switch control signal of the switch control circuit may be a wireless signal.

A control method for an on-load voltage regulation tap switch for transformer includes following steps.

In step (1), opening K1 and closing K2 if transition from connecting a power supply end A with a transformer tap 1 to connecting the power supply end A with a transformer tap 2 is to be completed: ① first closing K11 during a negative semi-cycle of the current; ② opening K1 and closing K21 during the subsequent positive semi-cycle of the current; ③ opening K11 and closing K2 during the subsequent negative semi-cycle of the current; and ④ then opening the K21, thereby completing a process of opening the K1 and closing the K2.

In step (2), Opening K2 and closing K1 if transition from connecting the power supply end A with the transformer tap 2 back to connecting the power supply end A with the transformer tap 1 is to be completed: ① first closing K21 during the positive semi-cycle of the current; ② opening K2 and closing K11 during the subsequent negative semi-cycle of the current; ③ opening K21 and closing K1 during the subsequent positive semi-cycle of the current; and ④ then opening the K11, thereby completing a process of opening the K2 and closing the K1.

The present invention has the beneficial effects as follows:

A reliable and practical on-load voltage regulation tap switch for transformer is provided; when in action, the switch contact produces no sparking or arcing; the transformer windings are prevented from being short-circuited; the changeover speed of the windings is high; and the changeover of the windings with no surge current and with continuous current is actually realized. Since the on-load voltage regulation tap switch for transformer has the characteristics that the contacts have no loss in the changeover process and no sudden change of current in the transformer windings is caused, the on-load voltage regulation tap switch for transformer can act frequently without influencing the service life of the switch and the transformer. Due to the above advantages of the on-load voltage regulation tap switch for transformer, the dynamic on-load voltage regulation of the transformer can be actually realized, which cannot be realized in a traditional on-load voltage regulation method for transformer. Compared with an existing on-load voltage regulation tap switch for transformer, the on-load voltage regulation tap switch for transformer of the present invention also has the advantages of small volume, light weight and low cost.

BRIEF DESCRIPTION OF THE DRAWINGS

The utility model is further described below in detail according to the drawings.

DETAILED DESCRIPTION

Figure 1:
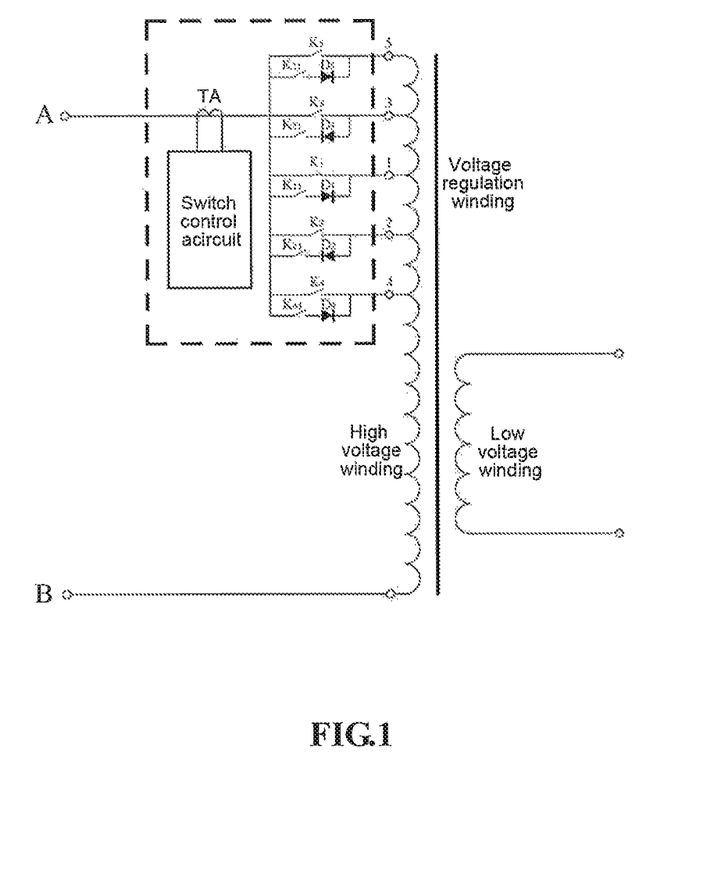
FIG. 1 is a schematic circuit diagram illustrating an on-load voltage regulation tap switch for transformer of the present invention.

As shown in FIG. 1, an on-load voltage regulation tap switch for transformer of the present invention includes a main switch group, switch contact protection branch circuits and a switch control circuit; the main switch group includes a plurality of relay switch contacts; one end of the switch group is connected with a corresponding transformer winding tap, and the other end of the switch group is connected with a power supply after being connected in parallel; each switch contact protection branch circuit of the switch group is a series circuit of a diode and an auxiliary relay contact and is respectively connected with two ends of a corresponding switch in parallel.

Figure 2:
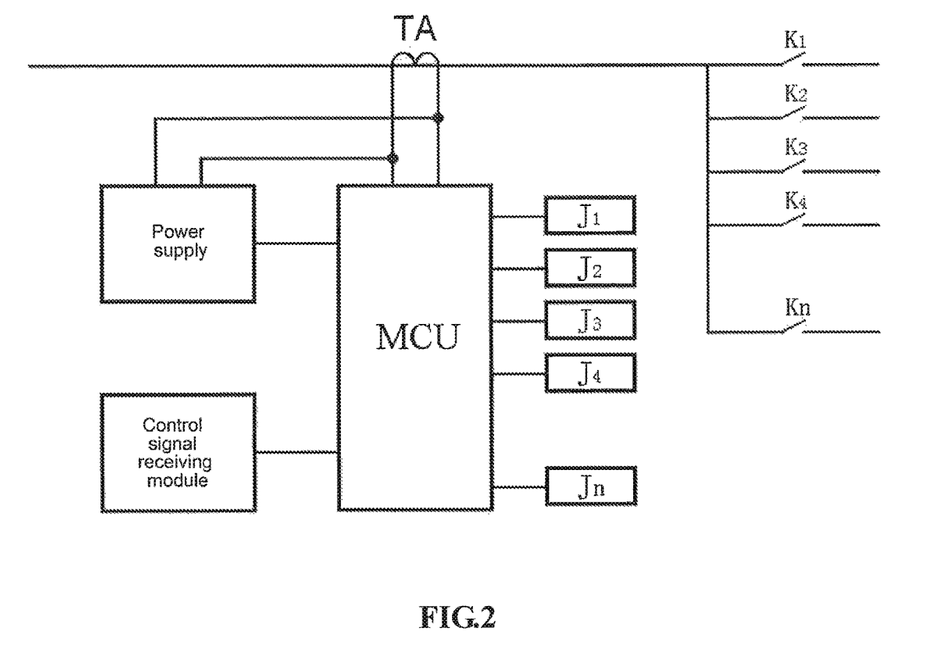
FIG. 2 is a principle block diagram illustrating a control circuit of an on-load voltage regulation tap switch for transformer of the present invention.

The tap switch control circuit shown in FIG. 2 is composed of a power supply, a single chip microprocessor, a current transformer, a control signal receiving module and other circuits; a power supply circuit supplies working power to the single chip microprocessor (MCU), main switch relays and auxiliary switch relays; a current output from the current transformer can be used as an input of the power supply circuit and used for powering the single chip microprocessor and relays after rectification, filtering and voltage-stabilizing; and the advantage of adopting the current transformer as the input of the power supply is that it is unnecessary to obtain the power supply from a high-voltage end of the alternating-current power, thereby simplifying the structure of the switch control circuit and improving the reliability of the circuit. A control signal of the on-load voltage regulation switch can directly control the switch control circuit in a wired manner; and when a busbar voltage is not very high, a manner of controlling an optocoupler through an electrical signal can be employed; and if the busbar voltage is very high, a method of transmitting the control signal through an optical fiber can be employed. The present invention proposes a manner of wirelessly transmitting the control signal; insulation and creepage problems between a control end and the on-load voltage regulation switch can be easily solved by adopting the wireless control manner; a control signal receiving module can employ an infrared or wireless communication manner, the infrared communication is simple and insusceptible to the interference, but the infrared communication requires no blocking between a transmitting module and the receiving module; the on-load voltage regulation tap switch for transformer is generally required to be sealed due to the insulation and dustproof requirements, so that an infrared signal is easy to be shielded. By employing an ultrahigh-frequency wireless communication mode, the dead-zone-free reception and control between the transmitting module and the receiving module can be realized; and the wireless receiving can employ communication modes such as Bluetooth, Zigbee or Wifi and the like. In this way, the on-load voltage regulation tap switch is equivalent to a switch group hung on a power supply busbar; the power supply busbar is connected with different loads through the switch group; a controller (not shown in FIG. 1 and FIG. 2) can control the connection and disconnection of different switches in the switch group through the wireless signal; the switch control circuit controls all main switches and auxiliary switches to act according to a certain time sequence so as to complete switching of the transformer windings; and it is ensured that there is always one switch contact in a closed state in the changeover process of the switches, so that the voltage withstanding requirement of the switch group can be reduced. In the embodiment shown in FIG. 1, only five transformer winding taps are drawn; and n transformer winding taps are cooperated with n groups of tap switches, so that the on-load voltage regulation of the transformer with n taps can be realized, and the circuit structure is not repeated herein.

In order to ensure that there is always one switch contact in a closed state in the main switch group of the on-load voltage regulation switch when the transformer is not powered, a relay used by the main switch may be a magnetic latching relay. Furthermore, by using the magnetic latching relay, the power consumption of the switch control circuit can further be reduced, so that the volume of the on-load switch for transformer can be reduced, and the cost of the entire tap switch can be decreased.

Figure 3:
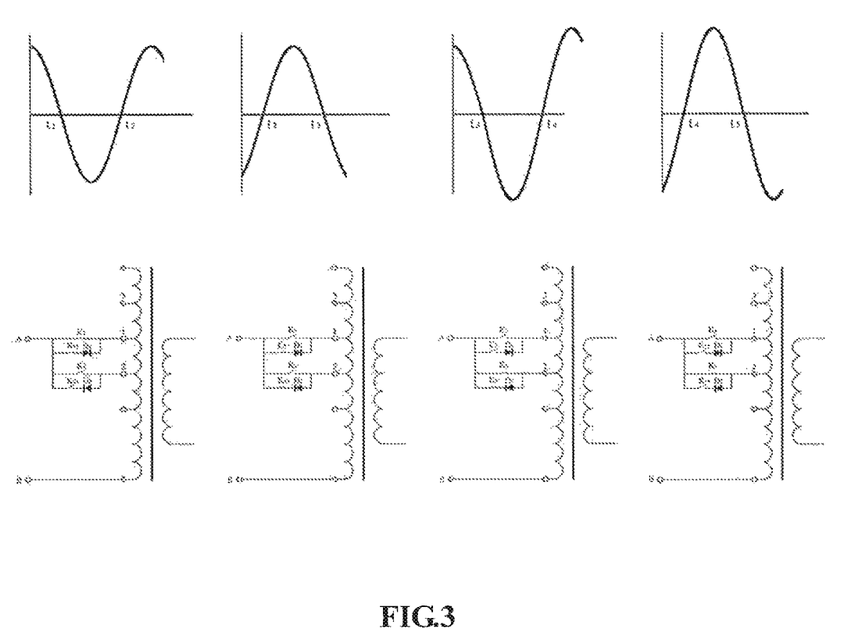
FIG. 3 is a schematic diagram I illustrating an action sequence of an on-load voltage regulation tap switch for transformer of the present invention.
Figure 4:
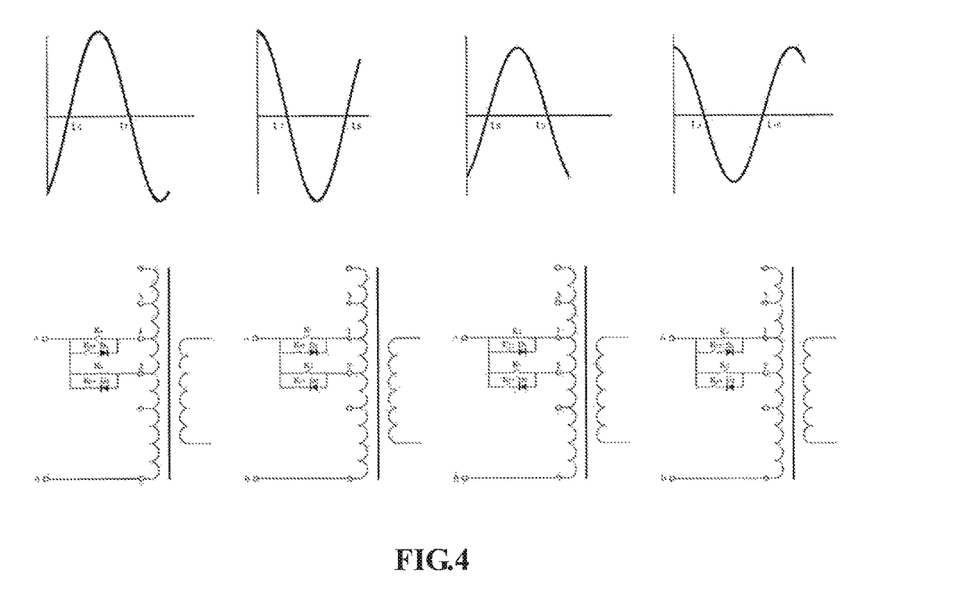
FIG. 4 is a schematic diagram II illustrating an action sequence of an on-load voltage regulation tap switch for transformer of the present invention.

A control method of the on-load voltage regulation tap switch for transformer is described below in combination with FIG. 3 and FIG. 4:

(1) to complete transition from connecting a power supply end A with a transformer tap 1 to connecting the power supply end A with a transformer tap 2, K1 is to be opened, and K2 is to be closed: ① K1 is closed first during a negative semi-cycle of the current (A is negative and B is positive in the cycle from t1 to t2); ② during the subsequent positive semi-cycle of the current (A is positive and B is negative in the cycle from t2 to t3), K1 is opened, K21 is closed, a diode D1 is switched on at the moment when the switch contact K1 is opened, the current flows through branch circuits of the K1.1 and the diode D1, and a voltage withstood on two ends of the contact K1 is 0.7V, so that no arcing is produced when K1 is disconnected; when K21 is closed, the diode K2 is in a cutoff state, and no current passes through the K21, so that the contact sparking is avoided when K21 is closed; ③ during the subsequent negative semi-cycle of the current (A is negative and B is positive in the cycle from t3 to t4), K11 is opened, K2 is closed, the diode D1 is cut off and D2 is switched on at the moment when the current is changed from positive to negative, the current is transferred from the branch circuit of K11 to the branch circuit of K21, and the current passing through the transformer windings is kept continuous without sudden change; when K2 is closed, the current may flow through the branch circuit of K2; when a mechanical contact switch is closed, the contact may joggle; when the K2 is disconnected at the moment of joggling, the diode D2 may be switched on immediately, the current is changed to flow through the branch circuit of K21 and is kept continuous; when K2 is closed again, the current may be changed to flow through the branch circuit of K2, and after the process is repeated for multiple times. K2 is stably closed; meanwhile, K11 is opened in the negative semi-cycle of the current, and since the diode D1 withstands the directional voltage, no arcing is produced when K11 is disconnected; ④ then the K21 is opened, thereby completing the process of opening K1 and closing K2; and since K2 is in the closed state, K21 can be opened without producing any influence.

(2) to complete transition from connecting the power supply end A with the transformer tap 2 back to connecting the power supply end A with the transformer tap 1, K2 is to be opened, and K1 is to be closed: ① K21 is closed first during the positive semi-cycle of the current (A is positive, and B is negative in the cycle from t6 to t7; ② during the subsequent negative semi-cycle of the current (A is negative, and B is positive in the cycle from t7 to t8), K2 is opened, K11 is closed, the diode D2 is switched on at the moment when the switch contact K2 is opened, the current flows through branch circuits of K21 to the diode D2, and the voltage withstood on two ends of the contact K2 is 0.7V, so that no arcing is produced when K2 is disconnected; when K11 is closed, since D1 is in a cutoff state, no current passes through K11, so that no sparking is produced; ③ during the subsequent positive semi-cycle of the current (A is positive, and B is negative in the cycle from t8 to t9), K21 is opened, K1 is closed, D2 is cut off and D1 is switched on at the moment when the current is changed from negative to positive, the current may be transferred from the branch circuit of K21 to the branch circuit of K11, and the current passing through the transformer winding is kept continuous; when K1 is closed, the current may flow through the branch circuit of K1; when the mechanical contact switch is closed, the contact will joggle; when K1 is disconnected at the moment of joggling, the diode D1 may be switched on immediately, the current is changed to flow through the branch circuit of K11 and kept continuous; when K1 is closed again, the current may be changed to flow through the branch circuit of K1, and after the process is repeated for multiple times, K1 is stably closed; meanwhile, K21 is opened in this positive semi-cycle of the current, and since the diode D2 withstands the directional voltage, no arcing is produced when K21 is disconnected; ④ then K11 is opened, thereby completing the process of opening K2 and closing K1; and since K1 is in the closed state, K11 can be opened without producing any influence.

Figure 5:
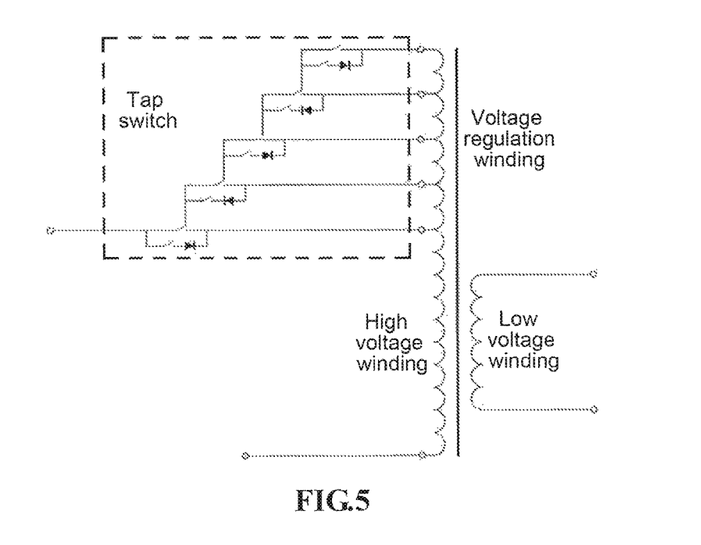
FIG. 5 is a diagram illustrating an embodiment I of an on-load voltage regulation tap switch for transformer of the present invention.

The switch group of the on-load voltage regulation tap switch for transformer is composed of a plurality of switch contacts; if any two groups of switch contacts are closed simultaneously, the transformer windings may be short-circuited, causing the heating and increased loss of the transformer. In order to prevent the short circuit situation of the transformer windings caused by the clamping or burning of the relay contacts, the present invention proposes a circuit structure of the on-load voltage regulation tap switch for transformer shown in FIG. 5. Relays K1 to K5 used, by the switch group of the on-load switch are all single-pole double-throw relays, so that regardless of the positions of contacts of all relays, the power supply end A can only be connected with one tap of the transformer windings, and the short circuit situation between any two transformer taps can be prevented. When the transformer winding taps are switched, the action sequence of the switch group is the same as the sequence described in FIG. 1, FIG. 3 and FIG. 4, which is easily understood by those skilled in the art and is not repeated herein.

Figure 6:
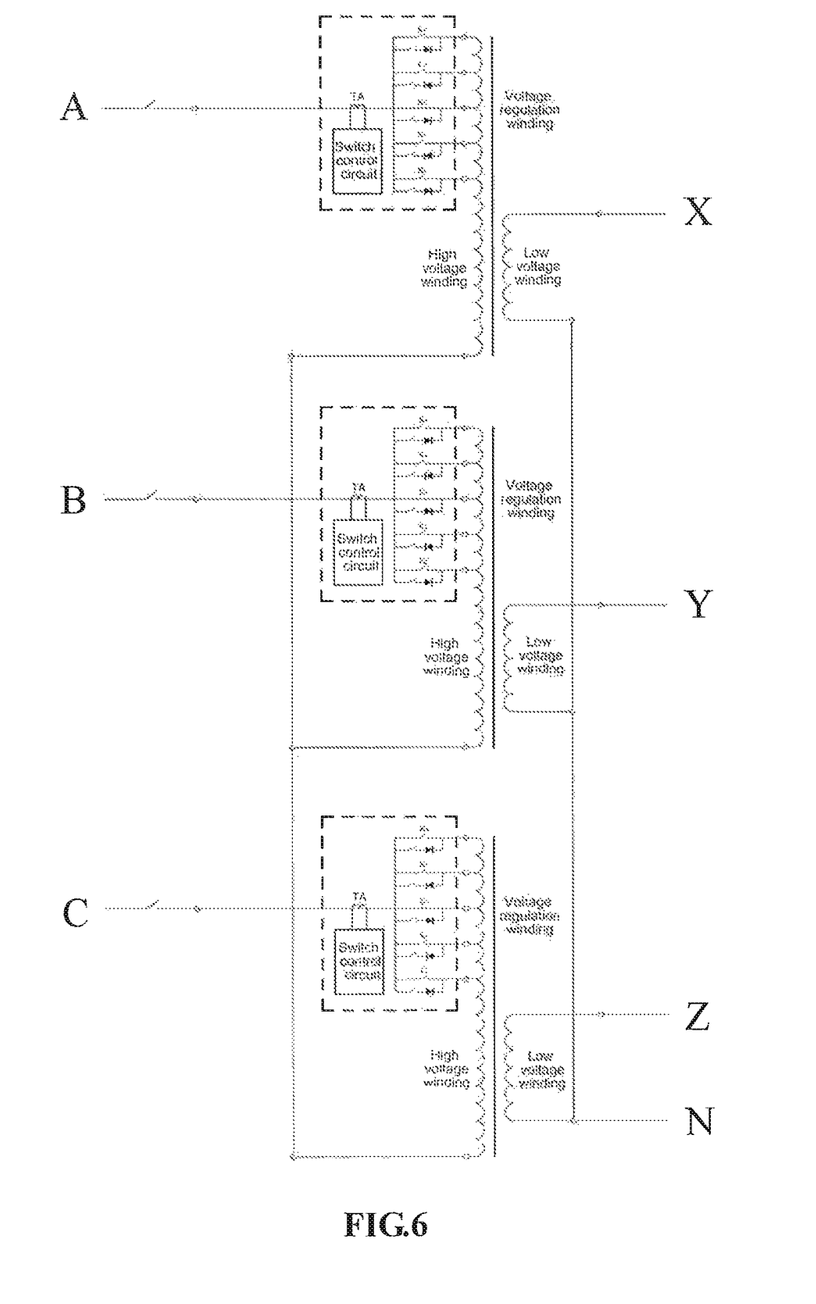
FIG. 6 is a diagram illustrating an embodiment of a three-phase on-load voltage regulation tap switch for transformer of the present invention.

FIG. 6 is a diagram illustrating an embodiment of a three-phase on-load voltage regulation switch of a 10 KV three-phase transformer; three-phase high-voltage ends of the transformer are respectively connected with an on-load voltage regulation tap switch; the phase-A, phase-B and phase-C on-load voltage regulation switches may be controlled to act independently by operating a wireless controller (not shown in the figure); and after one phase of the on-load voltage regulation tap switch receives an action signal, a current signal will be detected, and the changeover of the switches is realized according to the time sequence of the switch actions so as to complete switching of a power supply and a winding, so that a purpose of regulating an output voltage is achieved.

Figure 7:
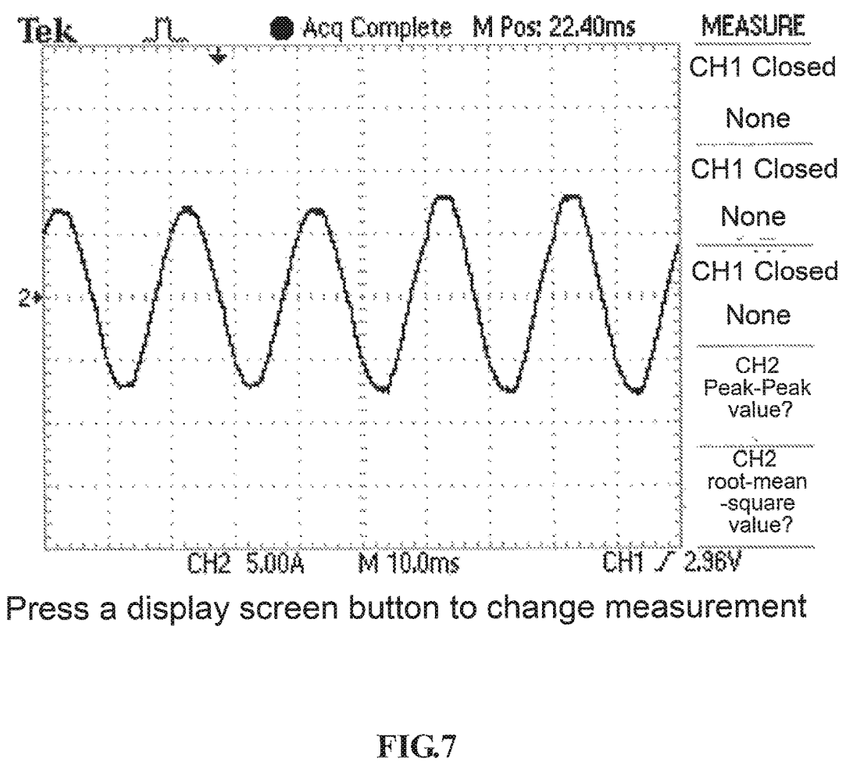
FIG. 7 is a current waveform diagram I illustrating an on-load voltage regulation tap switch for transformer of the present invention.
Figure 8:
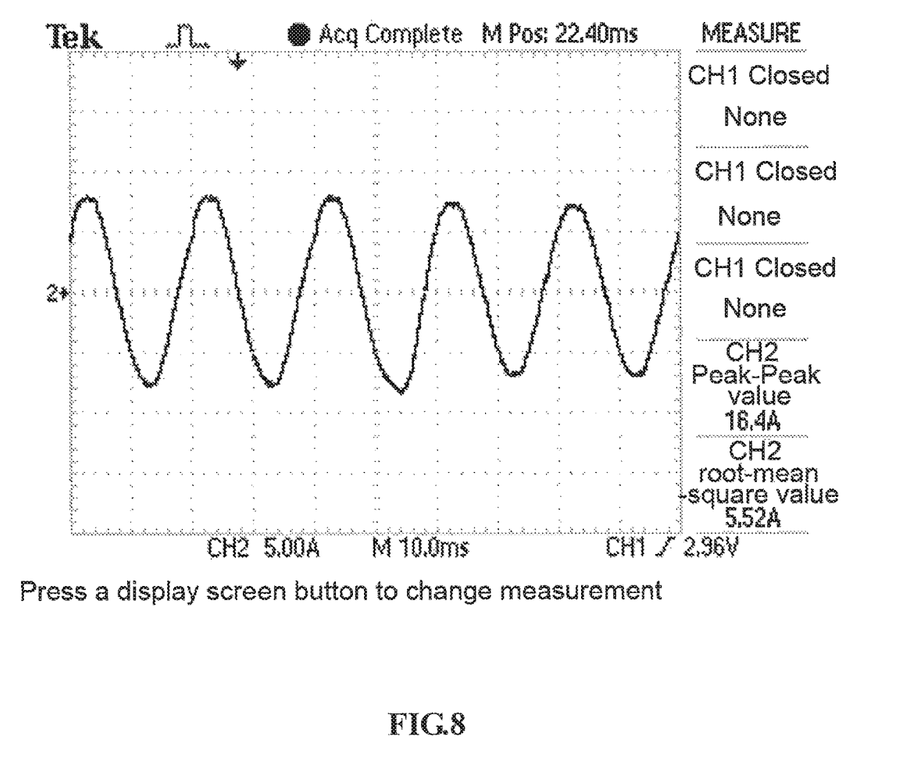
FIG. 8 is a current waveform diagram II illustrating an on-load voltage regulation tap switch for transformer of the present invention.

FIG. 7 and FIG. 8 are current waveform diagrams when windings of the on-load voltage regulation tap switch for transformer of the present invention are switched. It can be seen that the current flowing through the windings is continuous without interruption in the on-load switching process of the transformer windings; and moreover, the switch for switching the windings would not have the sparking and arcing phenomenon, thereby not only greatly prolonging the service life of the switch, but also making the dynamic on-load voltage regulation of the transformer possible.

For a transformer with higher working voltage, such as a transformer of 110 KV or higher, the voltage of a voltage regulation winding may exceed the withstanding voltage of a single relay contact, so that a plurality of relays can be connected in series to realize the switching of the high voltage windings under this situation. By using this method, the on-load voltage regulation of the transformer with any high voltage can be theoretically realized; and the contacts are ensured to have no sparking, no arcing and no sudden change of the current when the tap switch acts, which cannot be realized by using a traditional on-load voltage regulation technology.

The on-load voltage regulation switch of the present invention may also be arranged at an output end of the transformer to realize the on-load voltage regulation, and the principle is the same as the on-load voltage regulation switch arranged at an input end of the transformer.

When in use, in terms of functions: when the on-load voltage regulation tap switch for transformer provided by the present invention switches the transformer windings, no short-circuit current is generated in the transformer windings, and the input current and the output current of the transformer are continuous, which cannot be realized by the traditional on-load voltage regulation tap switch for transformer. The on-load voltage regulation tap switch for transformer provided by the present invention has the advantages that no loss of the transformer is produced, and no power supply pollution is caused. Furthermore, since the switch has no sparking and no arcing when in action, the service life of the switch is greatly prolonged; and meanwhile, the on-load voltage regulation for transformer can also be frequently and dynamically carried out, which is beneficial for improving the power supply quality of a power grid.

In terms of energy conservation: the on-load voltage regulation tap switch for transformer provided by the present invention needs no external power supply and directly adopts the current transformer to supply the power, and the power consumption of one group of switches is less than 1 W, which is incomparable for the traditional on-load voltage regulation switch.

The present invention is not limited to the above embodiments. Any person may be enlightened by the present invention to obtain other products in various forms, but technical solutions that are same as or similar to those of the present application shall fall within the protection scope of the present invention regardless of any change made to the shape or structure.

What is claimed is:

1. An on-load voltage regulation tap switch for a transformer comprising:
   a main switch group, switch contact protection branch circuits and a switch control circuit;
   wherein the main switch group comprises a plurality of relay switch contacts;
   wherein one end of each relay switch contact of the main switch group is connected with a corresponding transformer winding tap, and each of other ends of the relay switch contacts of the main switch group is are connected with a power supply after being connected in parallel;
   each switch contact protection branch circuit for each relay switch contact of the main switch group is a series circuit comprising only a diode and an auxiliary relay contact, wherein each switch contact protection branch circuit is respectively connected in parallel with the two ends of a corresponding switch contact within the relay switch contacts of the main switch group;
   the switch control circuit is composed of a control circuit power supply, a single chip microprocessor, a current transformer and a control signal receiving module; and
   all relay switch contacts of the main switch group and auxiliary relay contacts of the switch contact protection branch circuits are controlled by the switch control circuit to act according to a certain time sequence so as to complete switching of transformer windings and ensure that there is always one relay switch contact in a closed state.

2. The on-load voltage regulation tap switch for transformer according to claim 1, wherein the power supply of the switch control circuit is provided by the current transformer.

3. The on-load voltage regulation tap switch for transformer according to claim 1, wherein the main switches and the auxiliary switches are magnetic latching relays.

4. The on-load voltage regulation tap switch for transformer according to claim 1, wherein a switch control signal of the switch control circuit is a wireless signal.

5. A control method for an on-load voltage regulation tap switch for a transformer, in which the on-load voltage regulation tap switch for transformer comprises: a main switch group, switch contact protection branch circuits and a switch control circuit; wherein the main switch group comprises a plurality of relay switch contacts including a first relay switch contact and a second relay switch contact; wherein one end of each relay switch contact of the main switch group is connected with a corresponding transformer winding tap, and each of other ends of the relay switch contacts of the main switch group is are connected with a power supply after being connected in parallel: each switch contact protection branch circuit for each relay switch contact of the main switch group is a series circuit comprising only a diode and an auxiliary relay contact, wherein each switch contact protection branch circuit is respectively connected in parallel with the two ends of a corresponding switch contact within the relay switch contacts of the main switch group; the switch control circuit is composed of a control circuit power supply, a single chip microprocessor, a current transformer and a control signal receiving module; and all relay switch contacts of the main switch group and auxiliary relay contacts of the switch contact protection branch circuits are controlled by the switch control circuit to act according to a certain time sequence so as to complete switching of transformer windings and ensure that there is always one relay switch contact in a closed state;

the control method comprising the following steps:
   step 1, a process of opening the first relay switch contact (K1) and closing the second relay switch contact (K2) if transition from connecting an end (A) of the power supply with a first transformer tap (1) to connecting the end (A) of the power supply with a second transformer tap (2) is to be completed:
   ① first closing a first auxiliary relay contact (K11) within the switch contact protection branch circuit corresponding to the first relay switch contact (K1) during a negative semi-cycle of a current flowing though the transformer;
   ② opening the first relay switch contact (K1) and closing a second auxiliary relay contact (K21) within the switch contact protection branch circuit corresponding to the second relay switch contact (K2) during a subsequent positive semi-cycle of the current flowing though the transformer;
   ③ opening the first auxiliary relay contact (K11) within the switch contact protection branch circuit corresponding to the first relay switch contact (K1) and closing the second relay switch contact (K2) during a subsequent negative semi-cycle of the current flowing though the transformer; and
   ④ then opening the second auxiliary relay contact (K21) within the switch contact protection branch circuit corresponding to the second relay switch contact (K2), thereby completing the process of opening the first relay switch contact (K1) and closing the second relay switch contact (K2);
   step 2, a process of opening the second relay switch contact (K2) and closing the first relay switch contact (K1) if transition from connecting the end (A) of the power supply with the second transformer tap (2) back to connecting the end (A) of the power supply with the first transformer tap (1) is to be completed:
   ① first closing the second auxiliary relay contact (K21) within the switch contact protection branch circuit corresponding to the second relay switch contact (K2) during a positive semi-cycle of the current flowing though the transformer;
   ② opening the second relay switch contact (K2) and closing the first auxiliary relay contact (K11) within the switch contact protection branch circuit corresponding to the first relay switch contact (K1) during a subsequent negative semi-cycle of the current flowing though the transformer;
   ③ opening the second auxiliary relay contact (K21) within the switch contact protection branch circuit corresponding to the second relay switch contact (K2) and closing the first relay switch contact (K1)

during a subsequent positive semi-cycle of the current flowing though the transformer; and ④ opening the first auxiliary relay contact (K11) within the switch contact protection branch circuit corresponding to the first relay switch contact (K1), thereby completing the process of opening the second relay switch contact (K2) and closing the first relay switch contact (K1).

6. The method according to claim 5, wherein the power supply of the switch control circuit is provided by the current transformer.

7. The method according to claim 5, wherein the main switches and the auxiliary switches are magnetic latching relays.

8. The method according to claim 5, wherein a switch control signal of the switch control circuit is a wireless signal.

\* \* \* \* \*